US011017006B2

(12) United States Patent
Chatterjee et al.

(10) Patent No.: US 11,017,006 B2
(45) Date of Patent: May 25, 2021

(54) METHOD AND SYSTEM FOR GENERATING REVIEW SUMMARIES

(71) Applicant: Wipro Limited, Bangalore (IN)

(72) Inventors: Arindam Chatterjee, Gondalpara (IN); Manjunath Ramachandra Iyer, Bangalore (IN); Vinutha Bangalore Narayanamurthy, Bangalore (IN)

(73) Assignee: Wipro Limited, Bangalore (IN)

( * ) Notice: Subject to any disclaimer, the term of this patent is extended or adjusted under 35 U.S.C. 154(b) by 78 days.

(21) Appl. No.: 16/357,901

(22) Filed: Mar. 19, 2019

(65) Prior Publication Data

US 2020/0285662 A1 Sep. 10, 2020

(30) Foreign Application Priority Data

Mar. 9, 2019 (IN) .............................. 201941009230

(51) Int. Cl.
| | |
|---|---|
| *G06F 16/34* | (2019.01) |
| *G06F 16/35* | (2019.01) |
| *G06K 9/62* | (2006.01) |
| *G06N 3/04* | (2006.01) |
| *G06F 40/35* | (2020.01) |
| *G06F 40/279* | (2020.01) |

(52) U.S. Cl.
CPC .......... *G06F 16/345* (2019.01); *G06F 16/353* (2019.01); *G06F 40/279* (2020.01); *G06F 40/35* (2020.01); *G06K 9/6256* (2013.01); *G06N 3/049* (2013.01)

(58) Field of Classification Search
USPC ................................................ 704/7–10, 257
See application file for complete search history.

(56) References Cited

U.S. PATENT DOCUMENTS

| | | | |
|---|---|---|---|
| 5,867,164 A | 2/1999 | Bornstein et al. | |
| 2008/0082499 A1 | 4/2008 | Koski | |
| 2013/0311485 A1* | 11/2013 | Khan | .................... G06F 16/335 |
| | | | 707/748 |
| 2017/0154055 A1* | 6/2017 | Dimson | .............. G06F 16/5838 |
| 2018/0232362 A1* | 8/2018 | Khan | .................. G06F 16/3344 |
| 2019/0332666 A1* | 10/2019 | Dadachev | .............. G06N 20/00 |
| 2019/0341050 A1* | 11/2019 | Diamant | .................. H04N 7/15 |
| 2020/0073937 A1* | 3/2020 | Zhao | .......... G06N 3/08 |
| 2020/0126584 A1* | 4/2020 | Huang | ................ G10L 15/1815 |

* cited by examiner

*Primary Examiner* — Leonard Saint Cyr
(74) *Attorney, Agent, or Firm* — Finnegan, Henderson, Farabow, Garrett & Dunner, LLP

(57) ABSTRACT

The present disclosure relates to a method and a system for generating sentiment-based summaries for a user review. In an embodiment, a text analyzer receives a block of text indicating a user review. The text analyzer may generate one or more vectors for the plurality of words. Further, a relation is identified among the one or more vectors. A model is trained to identify a relation among the one or more vectors. Using the relation between the one or more vectors, a sentiment associated with the block of text is determined. Thereafter, one or more keywords from the block of text contributing to the determined sentiment is are identified and are classified into categories according to the sentiment contributed by the one or more words. Thereafter, the summary is generated for each category using the corresponding one or more words.

14 Claims, 5 Drawing Sheets

METHOD AND SYSTEM FOR GENERATING REVIEW SUMMARIES

TECHNICAL FIELD

The present disclosure relates to generating summaries for a block of text. More particularly, the present invention relates to a method and system for generating sentiment-based summary for user reviews.

BACKGROUND

Currently, with the increased usage of digital content, the volume of text documents is increasing. Often, users find it difficult to go through the full document. Hence, a summarized version of the text in the documents can suffice user requirements. Based on certain keywords in the summarized content, the user can access the detailed content from the original document. Conventionally, few techniques based on the keywords or repeating words are available to summarize content.

The conventional techniques may work for a generic text document. However, the conventional techniques do not provide accurate results for text falling under multiple classes such as product/service, reviews on social media, sentiments (i.e., positive sentiment and negative sentiment, neutral sentiment), etc. The positive sentiment refers, but not limited, to a sentiment or a feedback statement from the user, that describes a product/service in a good perspective. The negative sentiment refers, but not limited, to a review or a feedback statement from the user that speak bad about the product/usage, service, etc. In the conventional techniques, even the neutral sentiment is considered for summarizing, instead of being discarded. The neutral sentiment refers, but not limited, to a review or feedback statement from the user, that speak neither good nor bad about the product usage/service, etc. The neutral sentiment can include comments that are unrelated to the product usage/service and are generic in nature.

For example, let us consider a scenario of a movie review. The reviewer can provide comments that are unrelated to the movie itself, such as generic comments on movie genre, cinemas, screening quality, cost of ticket etc. The review about the movie may also be provided along with the comments on unrelated contents. Although, the unrelated contents do not effectively provide a review of the movie, the summary generated using conventional techniques may consider the keywords of such comments for generating a summary. Hence, an accurate summary of the movie may not be generated.

In the conventional mechanisms, summarization of content is keyword-based and does not provide a meaningful representation of the text when the summary has to be skewed towards a class during the classification of a block of text. For example, consider a scenario that the user provides feedback on a movie, a hotel, a mall, or the like. Here, the review provided by the user may relate to both positive and negative sentiments. However, if it is required to summarize only the positive sentiments from the sentences, for the purpose of advertisement or business strategy, the conventional mechanisms fail to address the problem. Likewise, if it is required to summarize the negative sentiments from the sentences for improving quality of product/service, the conventional mechanisms fail to address the problem.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for generating sentiment-based summaries. The method includes receiving a block of text including a plurality of words indicating a user review. One or more vectors are generated for the block of text. The one or more vectors are used to determine a sentiment in the user review. The sentiment can be at least one of a positive sentiment, a negative sentiment, or a neutral sentiment. Further, a relation among the one or more vectors is identified using a trained model. In an embodiment, the trained model is trained using a plurality of training vectors corresponding to a plurality of words of a training text. Furthermore, one or more words are associated to the at least one sentiment determined. In an embodiment, the one or more words may contribute to the at least one sentiment determined. Thereafter, the one or more words are classified into one or more categories based on respective sentiment associated. Lastly, a summary is generated for the user review based on the one or more keywords in each category. The summary generated is based on the sentiment of the user review.

In an embodiment, the present disclosure discloses a text analyzer for generating sentiment-based summaries. The text analyzer includes a communication module configured to receive a block of text comprising a plurality of words indicating a user review. The text analyzer further includes a sentiment analysis module configured to generate one or more vectors for the block of text, for determining at least one sentiment in the user review. The sentiment analysis module is further configured to identify a relation among the one or more vectors using a trained model. In an embodiment, the trained model is generated using a plurality of words of a training text. In an embodiment, the sentiment can be at least one of a positive sentiment, a negative sentiment, or a neutral sentiment. The text analyzer further includes a classification module configured to associate one or more words from the plurality of words from the block of text to at least one sentiment determined. Thereafter, the classification module is configured to classify the one or more words into one or more categories based on the determined at least one sentiment. The text analyzer further includes a summary generator configured to generate a summary of the block of text using the one or more words classified in each category based on the at least one sentiment.

In an embodiment, the present disclosure discloses a computer readable media comprising instructions thereon for generating sentiment-based summaries. The instructions when processed by at least one processor causes a device to receive a block of text including a plurality of words indicating a user review. One or more vectors are generated for the block of text. The one or more vectors are used to determine a sentiment in the user review. The sentiment can be at least one of a positive sentiment, a negative sentiment, or a neutral sentiment. Further, device is caused to identify a relation among the one or more vectors using a trained model. In an embodiment, the trained model is trained using a plurality of training vectors corresponding to a plurality of words of a training text. Furthermore, one or more words are associated to the at least one sentiment determined. In an embodiment, the one or more words may contribute to the at least one sentiment determined. Thereafter, the one or more words are classified into one or more categories based on respective sentiment associated. Lastly, a summary is generated for the user review based on the one or more keywords in each category. The summary generated is based on the sentiment of the user review.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
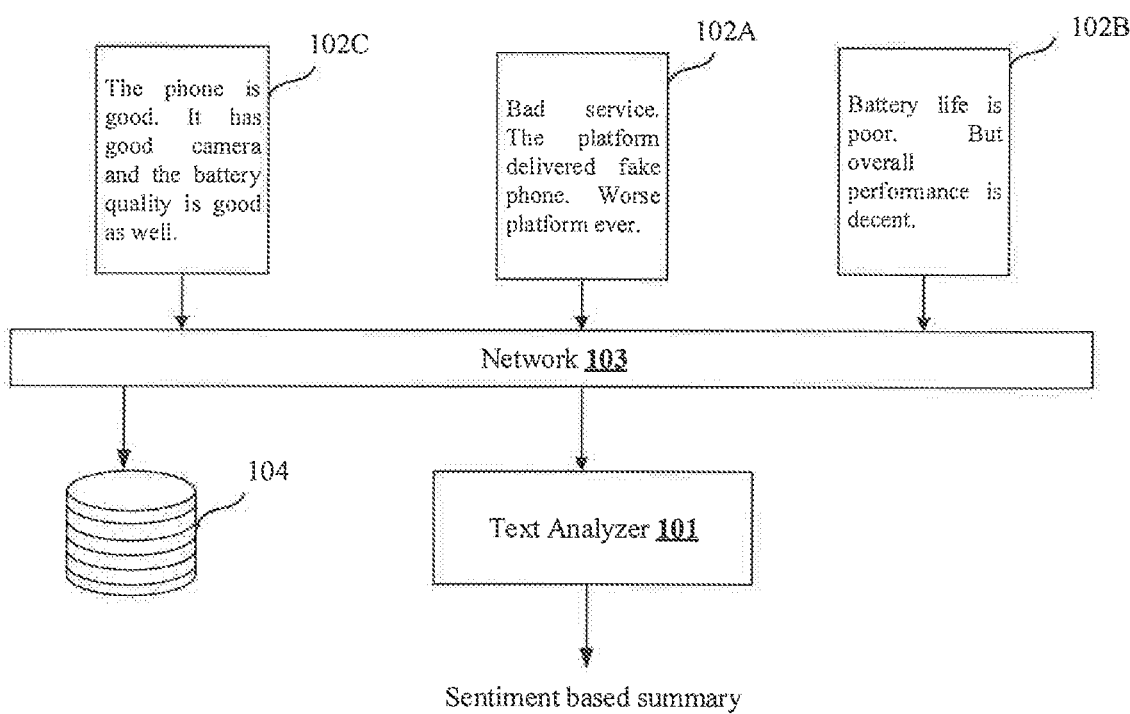
FIG. 1 shows a block diagram for generating sentiment-base summaries, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for generating sentiment-based summaries for a user review. In an embodiment, a text analyzer receives a block of text indicating a user review. The bock of text may comprise a plurality of words providing a review of a product or a service. The text analyzer may generate one or more vectors for the plurality of words. The one or more vectors may be generated using a machine learning or deep learning techniques. Further, the machine learning (alternatively may be referred as deep learning techniques) may be further used to identify a relation among the one or more vectors. In an embodiment, a model is trained using machine learning techniques to identify a relation among the one or more vectors. Using the relation between the one or more vectors, a sentiment associated with the block of text is determined. Thereafter, one or more keywords from the block of text contributing to the determined sentiment may be is are identified and are classified into categories according to the sentiment contributed by the one or more words. Thereafter, the summary is generated for each category using the corresponding one or more words.

FIG. 1 shows a block diagram for generating sentiment-based summaries. As shown, FIG. 1 shows a text analyzer (101), a plurality of documents (102A, . . . 102N), each document having a block of text. In an embodiment, the text analyzer (101) may receive only one document or the plurality of documents (102A, . . . 102N). In an embodiment, documents (102A, . . . 102N) may be denoted in general as documents (102). In an embodiment, the document format may be physical paper format, or digital format (PDF™, WORD™, EXCEL™, and the like). If a paper format is provided to the text analyzer (101), a scanner (not shown) may be integrated with the text analyzer (101) to scan the paper and interpret the text in the paper. In an embodiment a binary file may also be provided to the text analyzer (101) as input. The binary format may indicate the plurality of words in the document (101). As seen in FIG. 1, the block of text may be a review provided by a user. The review may be provided for a product, process, or service used by the user. The review (also referred as user review) may have positive sentiments, negative sentiments, neutral sentiments or a combination thereof. For example, the user review in document (102A) indicates a negative review of a phone. The user review in document (102B) indicates a neutral review of the phone and the user review in documents document (102C) indicates a positive review of the phone. In an embodiment, the user review can have different sentiments towards different features of a product or a process or a service. In an embodiment, the text analyzer (101) may be connected to a network (103). In a further embodiment, the network (103) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. In a further embodiment, communication network may include, without limitation, a direct interconnection, wired connection, e-commerce network, a peer to peer (P2P) network, Local Area Network (LAN), Wide Area Network (WAN), wireless network (e.g., using Wireless Application Protocol (WAP)), the Internet, Wireless Fidelity (Wi-Fi), etc. In an embodiment, the text analyzer (101) may receive the documents (102) over the network (103).

In one embodiment, a database (104) may be connected to the network (103). In an embodiment, the database (104) may store the block of text present in the documents (102). The text analyzer (101) may retrieve the block of text from the database (104) for generating sentiment-based summary. In one embodiment, the text analyzer (101) may store analyzed blocks of text in the database (104) and may use the stored blocks of text for learning using machine learning techniques.

In an embodiment, the text analyzer (101) may receive a plurality of user reviews and provide a summary according to sentiment determined using the plurality of user reviews. In an embodiment, if the plurality of user reviews has more than one sentiment, then the text analyzer (101) may provide a summary based on each sentiment in the plurality of user reviews. In an embodiment, the text analyzer (101) may determine a sentiment in the plurality of user reviews using machine learning techniques.

Figure 2:
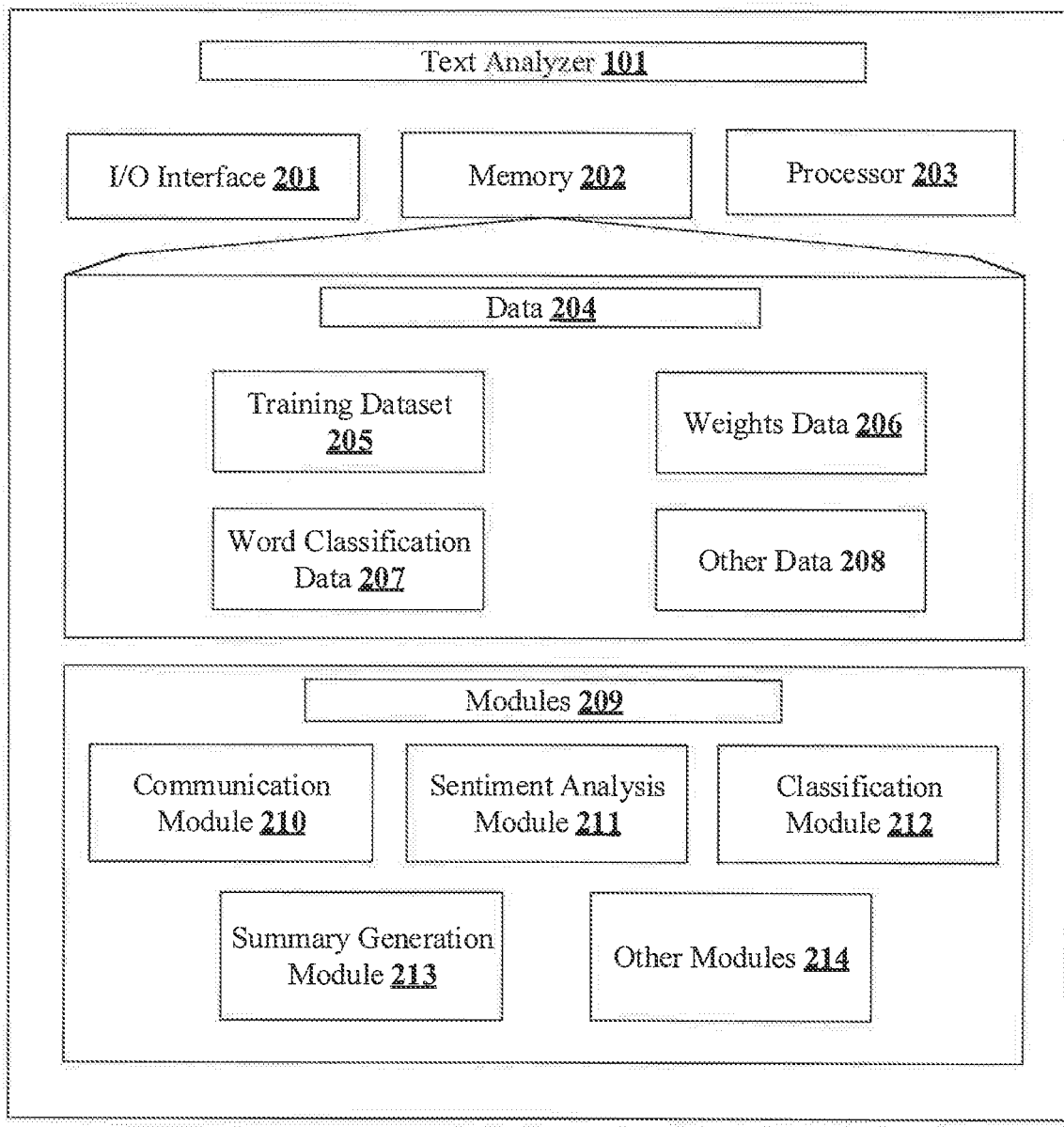
FIG. 2 shows an internal architecture of a text analyzer for generating sentiment-based summaries, in accordance with some embodiments of the present disclosure.

FIG. 2 illustrates internal architecture of the text analyzer (101) in accordance with some embodiments of the present disclosure. The text analyzer (101) may include at least one Central Processing Unit ("CPU" or "processor") (203) and a memory (202) storing instructions executable by the at least one processor (203). The processor (203) may comprise at least one data processor for executing program components for executing user or system-generated requests. The memory (202) is communicatively coupled to the processor (203). The text analyzer (101) further comprises an Input/Output (I/O) interface (201). The I/O interface (201) is coupled with the processor (203) through which an input signal or/and an output signal is communicated.

In an embodiment, data 204 may be stored within the memory (202). The data (204) may include, for example, training dataset (205), weights data (206), word classification data (207) and other data (208).

In an embodiment, the training dataset (205) may include a plurality of training text. The plurality of training text may comprise samples of user reviews. In an embodiment, the training dataset (205) may be a file comprising the samples of user reviews. For example, the sample user reviews can include reviews provided for a movie, reviews provided for a restaurant, reviews provided for a television. In an embodiment, a platform enabling users to provide reviews may provide the sample user reviews to the text analyzer. For example, IMDB™ may provide sample reviews (say 10,000 user reviews) for a movie to the text analyzer (101). The training dataset (205) may further include training vectors. The training vectors are generated for the sample user reviews. The training vectors may indicate a context of words in the sample user reviews, semantic of the words in the sample user reviews, syntax similarity between words in the sample user reviews and a relationship between words in the sample user reviews.

In an embodiment, the weights data (206) may indicate weight associated with the plurality of words in the user review. The weight associated with a word may indicate the strength with which the word may contribute to a sentiment. For example, consider an example "the phone is horrible". The word "horrible" may carry more weight as this word may directly indicate a negative sentiment. Likewise, consider another example, "the food is very good". The words "good" may indicate a positive sentiment. However, more weight may be provided to the word "very" as this word exaggerates the positive sentiment.

In an embodiment, the word classification data (207) may comprise one or more categories of sentiments. Further, each category may comprise one or more words leading to respective sentiments. For example, the one or more categories may be a positive sentiment, a negative and a neutral sentiment.

In an embodiment, the other data (208) may include validation inputs from one or more analysts. For example, one or more operators may validate the result of the text analyzer (101). For example, when the text analyzer (101) considers a block of text to have a positive sentiment, an operator may provide inputs/correct the results of the text analyzer (101). Also, the operator may input weights for each word. The inputs provided by the operator may be used for training and analysis of texts in real-time.

In one implementation, the modules (209) may include, for example, a communication module 210, a sentiment analysis module (211), a classification module (212), a summary generation module (213) and other modules (214). It will be appreciated that such aforementioned modules (209) may be represented as a single module or a combination of different modules.

In an embodiment, the communication module (210) may receive the plurality of words indicating the user review. In one embodiment, the communication module (210) may receive the plurality of words in a document format as described before in this disclosure.

In an embodiment, the sentiment analysis module (211) may be configured to receive the user review including the block of text from the communication module (210). Further, the sentiment analysis module (211) may be configured to detect the sentiment of the input user review, as at least one of a positive sentiment, a negative sentiment or a neutral sentiment. Further, the sentiment analysis module (211) may be configured to use complex deep learning mechanisms to detect at least one sentiment. In an example embodiment, the analysis module (211) may use Recurrent Neural Networks (RNNs) to detect the at least one sentiment. Although, there are many variations to the RNNs, a stacked Long Short-Term Memory (LSTM) architecture may be used. In particular, a Bidirectional LSTM followed by a layer of LSTM may be used. The said technique may be state-of-the-art analyzer and may provide best accuracies for determining sentiment.

In an embodiment, the sentiment analysis module (211) may generate one or more vectors respectively for the plurality of words in the block of text. The one or more vectors may indicate a context of the respective word, semantic of the respective word, syntax similarity of the respective word and a relationship of the respective word with other plurality of words in the block of text. The sentiment analysis module (211) may be further configured to identify a relation among the one or more vectors using a trained model. The trained model may be the LSTM/Bi-LSTM model or combination thereof. The LSTM/Bi-LSTM model may be trained using the training dataset (205). In an embodiment, the LSTM/Bi-LSTM model may be configured to receive the one or more vectors and generate a context vector based on the relation among the one or more vectors. In an embodiment, an encoder of the text analyzer (101) may be used to implement the LSTM/Bi-LSTM technique to generate the context vector. In an embodiment, the context vector may be an encoded vector which may have a reduced dimension than the one or more vectors. Also, the encoder may remove noises present in the one or more vectors.

In an embodiment, a decoder of the text analyzer (101) may be used to decode the context vector to generate an output sequence may indicate at least one sentiment in the user review.

In an embodiment, the classification module (212) may be configured to receive the sentiment (at least one of positive sentiment, negative sentiment or neutral sentiment) of the input review text from the sentiment analysis module (211). After receiving the sentiment of the input user review, the classification module (212) may be configured to associate one or more words to the at least one sentiment. The association may be based on weights provided to each word. For example, in a negative user review having a plurality of words, a word "bad" may be provided a weight of 0.45 and a word "horrible" may be provided a weight of 0.55. A weight threshold may be associated with each sentiment, to compare weights of each word with respective weight threshold. If the weight of a word is more than the weight threshold of corresponding sentiment, then such words are associated to the corresponding sentiment. In the above example, the words "bad" and "horrible" may be directing the user review to be a negative sentiment. Hence, such words are associated with the negative sentiment as having more influence on the sentiment of the user review. Further, the classification module (212) classifies the one or more words into one or more categories based on the determined one or more sentiments. Considering the above example, the classification module (212) may classify the words "bad" and "horrible" into a category of negative sentiments. Likewise, each category (negative, positive, neutral) may comprise one or more words that direct the user review to respective sentiment.

In an embodiment, Layer-wise Relevance Propagation (LRP) may be used for classifying the one or more words. The LRP may be used to effectively scan across the layers of a neural network and extract the relevance of word in determination made by the sentiment analysis module (211).

In an embodiment, the summary generation unit (213) may be configured to generate a summary for each category based on the one or more words in respective category. The sentiment-based summaries may provide a deeper insight into why the reviews are positive or negative. In an embodiment, the summary generation module (213) may be configured to generate a negative summary and a positive summary for a user review comprising both negative and positive sentiments.

In an embodiment, a positive summary may be generated as an outcome of the summary generation module (213) for user reviews comprising only positive sentiment sentences in the user review. In an embodiment, a negative summary may be generated as an outcome of the summary generation module (213) for user reviews comprising only negative sentiment sentences in the user review. Unlike the conventional mechanisms, the generated summaries are much more relevant, because the summaries do not make use of generic frequently occurring words, or individually extracted words from the reviews.

In an embodiment, the summaries may be generated using a slot filling approach, where each of the one or more words is plugged into a pre-defined token. The slot filling approach is a simple and convenient mechanism, which can be used for summarization. In another embodiment, the summaries are generated as a sequence of text, through an Encoder-Decoder framework, which is deep learning framework, where the one or more words are provided as input and the summary is obtained as an output. The Encoder-Decoder framework may be more accurate, semantic in nature, and context dependent in comparison with the former.

In an embodiment, the other modules (214) may include but is not limited to, a rendering module. The rendering module may be configured to render the summaries to the one or more analysts for performing analysis on the summaries generated based on the sentiment.

Figure 3:
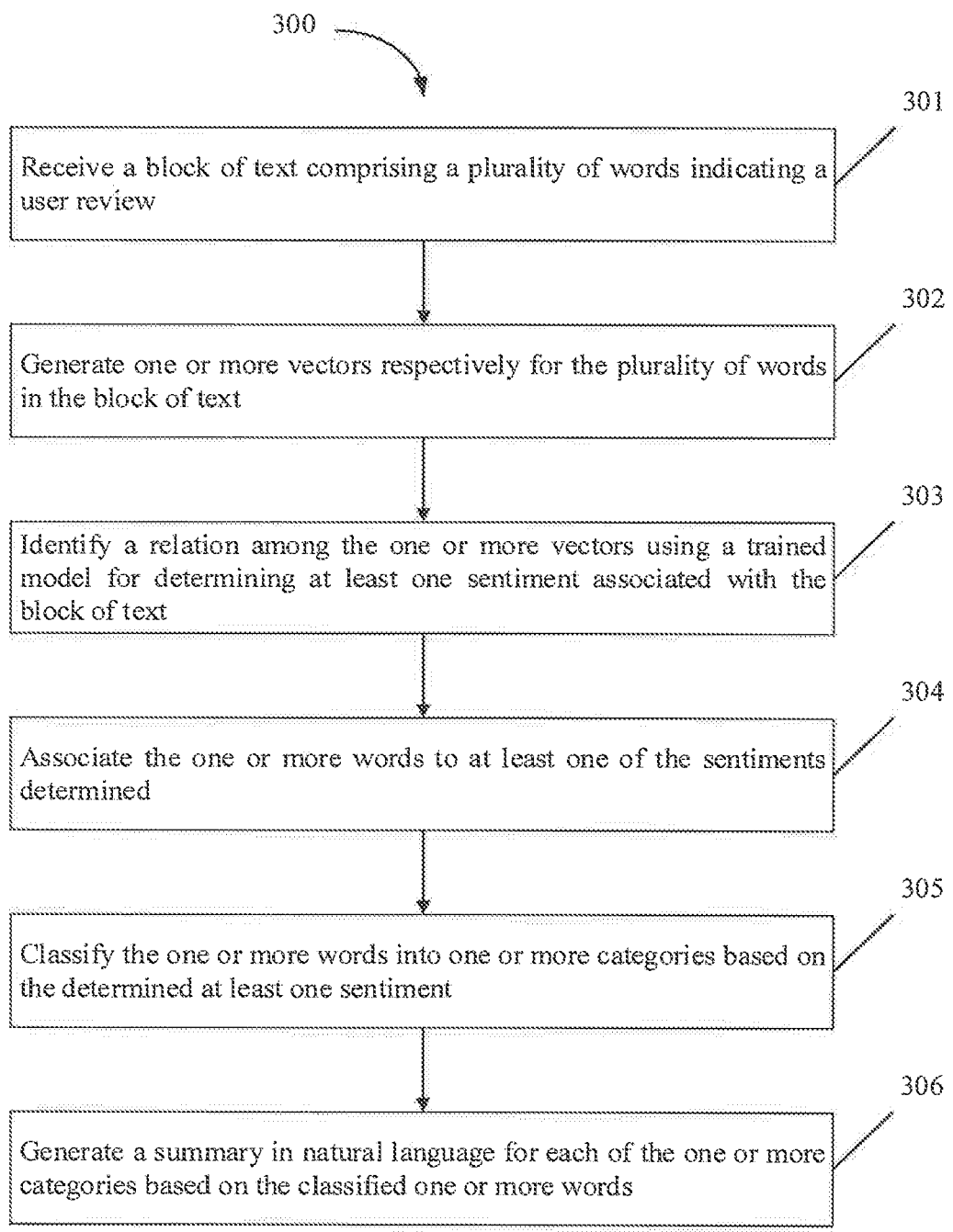
FIG. 3 shows an exemplary flow chart illustrating method steps for generating sentiment-based summaries, in accordance with some embodiments of the present disclosure.

FIG. 3 shows a flow chart illustrating a method for generating sentiment-based summaries, in accordance with some embodiments of the present disclosure. As illustrated in FIG. 3, the method (300) may comprise one or more steps. The method 300 may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step (301), the communication module (210) may receive the block of text comprising a plurality of words indicating user reviews. The block of text may be received in one or more documents (102A . . . 102N). The user reviews may be received in any format as described previously in the present disclosure. In an embodiment, the user reviews may be received from a platform enabling users to provide reviews for products/services. For example, user reviews may be received from IMDB™ which enables users to provide movie reviews.

At step (302), the sentiment analysis module (211) may generate one or more vectors respectively for the plurality of words in the block of text. In an embodiment, the one or more vectors may indicate a context of the respective word, semantic of the respective word, syntax similarity of the respective word and a relationship of the respective word with other plurality of words in the block of text.

At step (303), the sentiment analysis module (211) may identify a relation among the one or more vectors using the trained model. In an embodiment, the trained model (LSTM/Bi-LSTM model) may be trained during using a plurality of training text. In an embodiment, the training texts may be obtained from the platform or may be generated by the one or more analysts. The one or more analysts may generate the trained model by providing the training texts to the LSTM/Bi-LSTM models. In an embodiment, the one or more analysts may validate results of the LSTM/Bi-LSTM models during training. Further, according to the validations, the LSTM/Bi-LSTM models may be retrained to improve accuracy. During the training, the sentiment analysis module (211) may identify a relation among the one or more vectors. The relation may indicate how the respective words are used in a context, semantics of the word in the context, relation of object with subject, etc. The relation among the vectors may be used to identify sentiment of the user review. For example, consider a user review "The phone is very good". Let us consider one or more vectors are generated for each word for the above user review. In an embodiment, each vector may indicate a feature/attribute of respective word.

For example, three vectors may be generated for the word "phone", where a first vector may indicate a subject/object, a second vector may indicate a syntax of the word and a third vector may indicate a relation between the first vector and the second vector. Likewise, each word may be associated with one or more vectors.

The sentiment analysis module (211) may determine a relation among the one or more vectors of each word and determine at least one sentiment for the user review. In an embodiment, the user review can have a positive sentiment or a negative sentiment or a neutral review or any combination thereof. For example, consider a user review "the chicken was spicy, but the overall experience was okay". Here, the user review has a negative sentiment and a neutral sentiment. Thus, the sentiment analysis module (211) determines the user review to comprise a negative sentiment and a neutral sentiment. The sentiment analysis module (211) may comprise an encoder and a decoder. The encoder may receive the one or more vectors of each word and generate a context vector. The context vector is then decoded by the decoder to determine the at least one sentiment of the user review.

At step (304), the classification module (212) may associate one or more words from the plurality of words in the block of text to at least one sentiment determined for the user review. In an embodiment, the one or more words are identified based on a weight associated with each word. In an embodiment, the weight of a word may indicate a confidence of the word resulting in the determined sentiment. The one or more words having respective weights above the weight threshold may be contributing to the determined at least one sentiment.

At step (305), the classification module (213) may classify the one or more words into one or more categories. For example, the categories can include, a positive sentiment, a negative sentiment and a neutral sentiment. Each category may include one or more words that have contributed for the user review to be categorized into respective sentiment. In an embodiment, LRP technique may be used. In an embodiment, the classification may be performed based on weights associated with respective words. Based on the weights, the summary may emphasize the words. For example, considering 50 reviews, where the word "awesome" is used, the word "awesome" may be provided more weight compared to other words contributing to positive sentiment. In an embodiment, the word "awesome" may be emphasized while generating the summary.

In an embodiment, the LRP technique may find the relevance of each neuron in each layer of a neural network. Each neuron may have either a positive or a negative relevance:

$$R_i = \sum_j \frac{a_i w_{ij}^+}{\sum_i a_i w_{ij}^+} \quad (1)$$

In the equation, $R_i$ denotes the relevance of the neuron j and $a_i$ is the activation of the neuron I connected as the input to node j through the connecting weight $w_{ij}$. The summation is carried out for all neurons of the layer under consideration.

At step (306), the summary generation module (213) may generate a summary for each category using the one or more words in respective category. Here, the summary generation module (213) may use a text rank technique to generate the summary. In an embodiment, Natural Language Processing (NLP) may be used for generating the summary in the natural language. In an embodiment, encoder-decoder techniques are used.

In an embodiment, the summary generation module (213) may be trained to generate human understandable sentences with accurate form and structure, using the one or more words in each category. The summary generation module (213) may also generate the summary in a fixed vocabulary length (for example 150 words).

In one embodiment, the summary may be generated based on keywords in the user review. The sentences including maximum number of repeated words (barring the articles/conjunctions/preposition etc.) may be taken for the summary.

For example, consider a user review "the TV in hotel room is bad. The swimming pool is OK, food was good. But the TV was giving problems". The summary for the above example may be generated as follows "the TV in hotel room is bad. It was giving problems".

In another embodiment, sentences with maximum relevance value (LRP) may be considered for generating the summary. For each sentence, LRP of words may be added to get total LRP of sentence.

Figure 4:
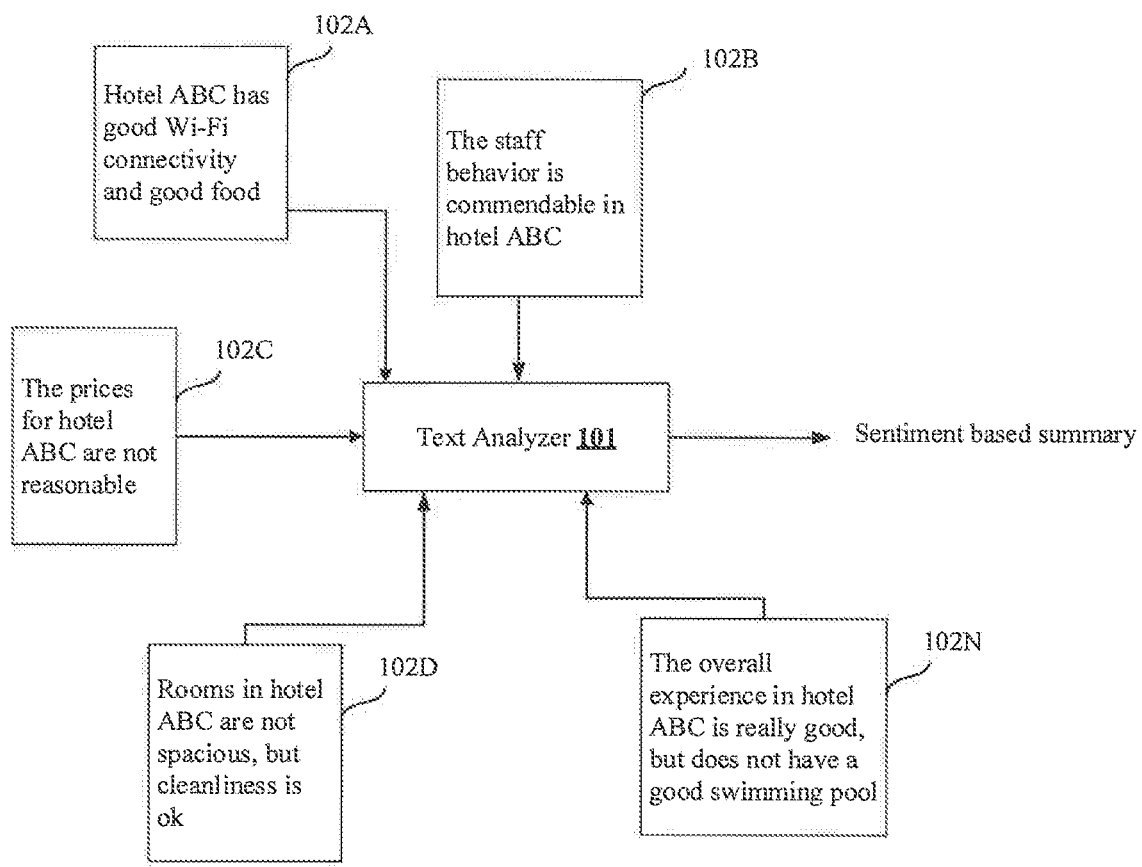
FIG. 4 shows an exemplary block diagram illustrating an example scenario for generating sentiment-based summaries, in accordance with some embodiments of the present disclosure.

FIG. 4 shows an exemplary illustration of generating summaries for user reviews on a hotel ABC. As shown in FIG. 4, four user reviews are provided for the hotel ABC. The user reviews may be captured in documents (102A ... 102N). As shown, the document (102A and 102B) may provide positive reviews regarding the hotel ABC. The document (102C) may provide a negative review. The documents (102D and 102N) may provide neutral reviews. In an embodiment all the user reviews are provided to the text analyzer (101). The text analyzer (101) may determine that the sentiment of the block of text in documents (102A and 102B) as positive sentiments. Likewise, the text analyzer (101) may determine that the sentiment of the block of text in document (102C) as negative sentiment, determine that the sentiment of the block of text in documents (102D and 102N) as neutral sentiment. Further, the text analyzer (101) may determine that the words "good" from the document (102A) and the word "commendable" from the document (102B) as words contributing to the positive sentiment. Likewise, the text analyzer (101) may determine that words "not reasonable" as contributing words to negative sentiment. Also, the text analyzer (101) may determine the words "not spacious", "OK", "really good" and "does not have swimming pool" as contributing words for neutral sentiment. Here, the words "not spacious" and "does not have swimming pool" may be considered as contributing to a negative sentiment. The words "OK" and "really good" may be contributing words for positive sentiment. The said words are classified according to respective sentiments. Further, the text analyzer (101) may generate a summary for each category based on the respective one or more words.

From the above example, a positive summary may be generated as "good Wi-Fi connectivity, good food, staff behaviour commendable, cleanliness is ok, overall experience is ok". Likewise, a negative summary may be generated as "prices are not reasonable, rooms are not spacious, does not have a good swimming pool".

In an embodiment, the present disclosure provides sentiment-based summary of user reviews. Thus, analysis of user reviews can be performed easily. Unlike conventional techniques, specific words contributing to the sentiment is used in the summary. Thus, such summary is more accurate, and the user requirements can be better understood.

Computer System

Figure 5:
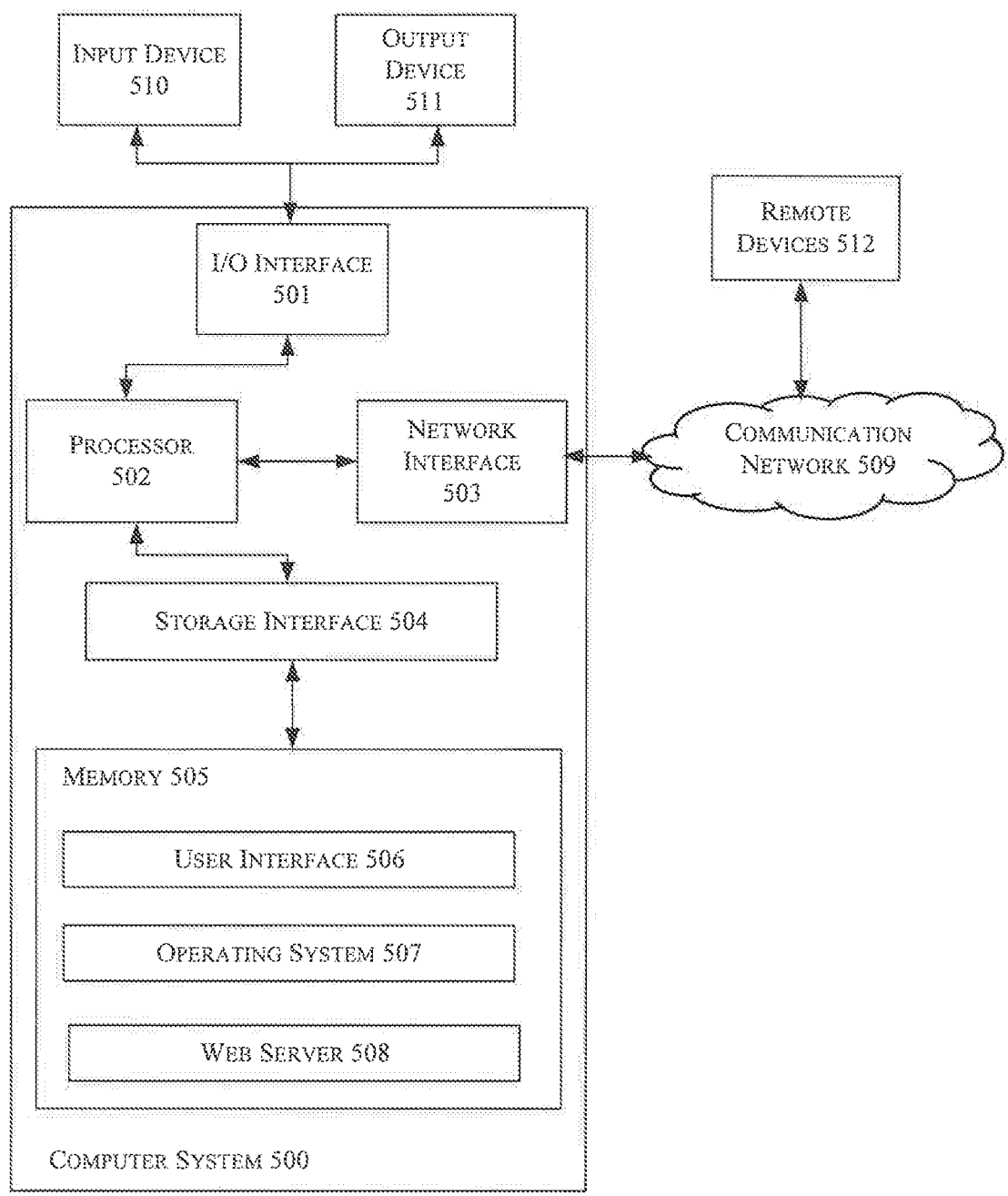
FIG. 5 shows a block diagram of a general-purpose computer system for generating sentiment-based summaries, in accordance with embodiments of the present disclosure.

FIG. 5 illustrates a block diagram of an exemplary computer system 500 for implementing embodiments consistent with the present disclosure. In an embodiment, the computer system 500 is used to implement generation of sentiment-based summary for user reviews. The computer system 500 may comprise a central processing unit ("CPU" or "processor") 502. The processor 502 may comprise at least one data processor. The processor 502 may include specialized processing units such as integrated system (bus) controllers, memory management control units, floating point units, graphics processing units, digital signal processing units, etc.

The processor 502 may be disposed in communication with one or more input/output (1/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the remote devices 512 through a communication network 509. The remote devices 512 may provide the user reviews to the computing network 500. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with the scene remote devices 512. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 6) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™⁰, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 101 | Text analyzer |
| 102 | User review documents |
| 103 | Network |
| 104 | Database |
| 201 | I/O interface |
| 202 | Memory |
| 203 | Processor |
| 204 | Data |
| 205 | Testing dataset |
| 206 | Weights data |
| 207 | Word classification data |
| 208 | Other data |
| 209 | Modules |
| 210 | Communication module |
| 211 | Sentiment analysis module |
| 212 | Classification module |
| 213 | Summary generation module |
| 214 | Other modules |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web service |
| 509 | Communication network |
| 510 | input device |
| 511 | Output device |
| 512 | Remote devices |

What is claimed is:

1. A method for generating sentiment-based summaries, comprising:

receiving, by a text analyzer, a block of text comprising a plurality of words indicating a user review;

generating, by the text analyser, one or more vectors respectively for the plurality of words in the block of text;

identifying, by the text analyzer, a relation among the one or more vectors using a trained model for determining at least one sentiment associated with the block of text, using a combination of Bidirectional Long Short-Term Memory (Bi-LSTM) and LSTM architecture, from a group of sentiments comprising at least a positive sentiment, a negative sentiment and a neutral sentiment, wherein one or more training vectors corresponding to a plurality of words of a training text are used for generating the trained model;

associating, by the text analyser, the one or more words to at least one of the sentiments determined;

classifying, by the text analyzer, the one or more words into one or more categories based on the determined at least one sentiment; and generating, by the text analyzer, a summary in natural language for each of the one or more categories based on the one or more words classified in the at least one sentiment.

2. The method of claim 1, wherein the one or more vectors indicate a context of the respective word, semantic of the respective word, syntax similarity of the respective word and a relationship of the respective word with other plurality of words in the block of text.

3. The method of claim 1, wherein the one or more training vectors are provided as inputs for generating the trained model, wherein the trained model is at least a Long Short-Term Memory (LSTM) model and a Bidirectional-LSTM model.

4. The method of claim 3, wherein at least the LSTM and the Bidirectional-LSTM models are trained to generate a context vector indicating a context of the user review, wherein the context vector is used to determine a sentiment associated with a plurality of block of test data comprising texts.

5. The method of claim 4, wherein the LSTM and the Bidirectional-LSTM models use an encoder-decoder model for generating the context vector using the one or more vectors and an output sequence using the context vector, wherein the output sequence indicates the sentiment associated with the block of text.

6. A text analyzer for generating sentiment-based summaries, comprising:
a processor; and
a memory, communicatively coupled to the processor, wherein the memory stores processor-executable instructions, which on execution cause the processor to:
receive a block of text comprising a plurality of words indicating a user review;
generate one or more vectors respectively for the plurality of words in the block of text;
identify a relation among the one or more vectors using a trained model for determining at least one sentiment associated with the block of text, using a combination of Bidirectional Long Short-Term Memory (Bi-LSTM) and LSTM architecture, from a group of sentiments comprising at least a positive sentiment, a negative sentiment and a neutral sentiment, wherein one or more training vectors corresponding to a plurality of words of a training text are used for generating the trained model;
associate the one or more words to at least one sentiment determined;
classify the one or more words into one or more categories based on the determined at least one sentiment; and
generate a summary in natural language for each of the one or more categories based on the one or more words classified in the at least one sentiment.

7. The text analyzer of claim 6, wherein the processor generates the one or more training vectors, wherein the one or more training vectors are provided as inputs for generating the trained model, wherein the trained model is at least a Long Short-Term Memory (LSTM) model and a Bidirectional-LSTM model.

8. The text analyzer of claim 7, wherein the processor generates a context vector indicating a context of the user review using at least the LSTM and the Bidirectional-LSTM models, wherein the context vector is used to determine a sentiment associated with a plurality of block of test data comprising texts.

9. The text analyzer of claim 6, wherein the processor generates a context vector using the one or more vectors and an output sequence using the context vector, wherein the output sequence indicates the sentiment associated with the block of text.

10. A non-transitory computer readable medium including instructions stored thereon that when processed by at least one processor cause a device to perform operations comprising:
receiving a block of text comprising a plurality of words indicating a user review;
generating one or more vectors respectively for the plurality of words in the block of text;
identifying a relation among the one or more vectors using a trained model for determining at least one sentiment associated with the block of text, using a combination of Bidirectional Long Short-Term Memory (Bi-LSTM) and LSTM architecture, from a group of sentiments comprising at least a positive sentiment, a negative sentiment and a neutral sentiment, wherein one or more training vectors corresponding to a plurality of words of a training text are used for generating the trained model;
associating the one or more words to at least one of the sentiments determined;
classifying the one or more words into one or more categories based on the determined at least one sentiment; and
generating a summary in natural language for each of the one or more categories based on the one or more words classified in the at least one sentiment.

11. The computer readable media as claimed in claim 10, wherein the one or more vectors indicate a context of the respective word, semantic of the respective word, syntax similarity of the respective word and a relationship of the respective word with other plurality of words in the block of text.

12. The computer readable media as claimed in claim 10, wherein the one or more training vectors are provided as inputs for generating the trained model, wherein the trained model is at least a Long Short-Term Memory (LSTM) model and a Bidirectional-LSTM model.

13. The computer readable media as claimed in claim 12, wherein at least the LSTM and the Bidirectional-LSTM models are trained to generate a context vector indicating a context of the user review, wherein the context vector is used to determine a sentiment associated with a plurality of block of test data comprising texts.

14. The computer readable media as claimed in claim 13, wherein the LSTM and the Bidirectional-LSTM models use an encoder-decoder model for generating the context vector using the one or more vectors and an output sequence using the context vector, wherein the output sequence indicates the sentiment associated with the block of text.

\* \* \* \* \*